United States Patent

Buesing

Patent Number: 6,009,684
Date of Patent: Jan. 4, 2000

[54] ASEPTIC VALVE ASSEMBLY

[75] Inventor: Jonathan P. Buesing, Maplewood, Minn.

[73] Assignee: Tetra Laval Holdings & Finance, SA, Pully, Switzerland

[21] Appl. No.: 08/926,312

[22] Filed: Sep. 5, 1997

Related U.S. Application Data

[63] Continuation-in-part of application No. 08/810,613, Feb. 28, 1997, Pat. No. 5,755,155.

[51] Int. Cl.[7] ........................................ B65B 55/10
[52] U.S. Cl. ............................ 53/167; 53/551; 141/91; 422/28
[58] Field of Search ............................ 53/551, 552, 554, 53/167; 141/91, 92; 422/28

[56] References Cited

U.S. PATENT DOCUMENTS

| | | | |
|---|---|---|---|
| 3,269,079 | 8/1966 | Schmied | 53/167 X |
| 4,547,339 | 10/1985 | McClure | 53/167 X |
| 4,734,268 | 3/1988 | Redding et al. | 53/167 X |
| 4,989,392 | 2/1991 | Lindgreen et al. | 53/167 |
| 5,040,354 | 8/1991 | Ahlers et al. | 53/167 |
| 5,044,140 | 9/1991 | Iwano et al. | 53/167 |
| 5,173,259 | 12/1992 | Bordini | 53/167 X |
| 5,591,396 | 1/1997 | Chiffon et al. | 422/28 |
| 5,630,310 | 5/1997 | Chadwell | 53/167 X |

*Primary Examiner*—Linda Johnson
*Attorney, Agent, or Firm*—Welsh & Katz, Ltd.

[57] ABSTRACT

An integrated valve assembly including a valve body defining at least two separate valves is disclosed. The valve assembly can be used, for example in an interface between an aseptic or pasteurized product supply vessel, one or more product dispensing machines, and a cleaning liquid supply vessel. The valve body can optionally be made in one piece, as by casting and machining a block of suitable metal such as stainless steel. Optionally, all of the interior surfaces of the valve body can be non-pooling surfaces which self-drain through at least one of the first, second, and third ports when the valve body is in the normal orientation and the necessary valves are open. The second face of the second weir optionally can be merged with the surfaces defining the second passage. Dead-legs and discontinuities in the valves which can collect undesired deposits are minimized, the size and weight of the valve assemblies are reduced, and the respective orientations of the integrated valves are fixed so the valves will operate and drain properly.

5 Claims, 11 Drawing Sheets

ASEPTIC VALVE ASSEMBLY

CROSS REFERENCES TO RELATED APPLICATIONS

This application is a continuation in part of U.S. patent application Ser. No. 08/810,613, filed Feb. 28, 1997 now U.S. Pat. No. 5,755,155.

BACKGROUND OF THE INVENTION

1. Field of the Invention

The present invention relates to a valve assembly useful for routing fluid through a piping system. Specifically, the present invention relates to an aseptic valve assembly for routing a flowable food product on a packaging machine.

1. Description of the Related Art

Aseptic packaging of milk, juice, other flowable foods, and other products requires that the product must be initially sterilized or otherwise treated, as by pasteurizing it. Then, throughout the packaging operation, the product must be kept sterile. Care must be taken to ensure that the product is not contaminated with cleaning fluids, lubricants, ambient air, or non-sterile matter. If the product is not aseptic (for example, properly-handled conventionally pasteurized milk is not aseptic), stringent steps must be taken to avoid trapping the product in any crevice, pocket, dead end or mechanism, as an entrapped product which is not aseptic when it enters may sustain microbial growth and may form unsightly lumps or particles. This machinery must be designed to facilitate regular inspection of any mechanism which might deteriorate and thus trap the product or expose it to contaminants.

Block-and-bleed valve assemblies, also known as "leak detector" valves, have been used to ensure that two process streams, like a sanitary product and a cleaning fluid which are to flow alternately through the same piping, do not mix, either during normal operation or due to leakage or other failure of a single valve. Two valves are provided in series in a block-and-bleed valve. The inlet valve is located at the inlet to the valve chamber, and is normally closed to stop the flow of one of the fluids into the chamber. The outlet valve is located at the outlet to the valve chamber, and is normally closed to stop the flow (usually, unintended backflow) of the other of the fluids into the valve chamber. A normally-open drain in the valve chamber, which is also valved, facilitates leak detection. For example, the drain tube leaving the valve can be transparent so any leakage into the drain may be seen by an operator.

In conventional block-and-bleed valves, two or more separate valve bodies are assembled to form the complete valve assembly, as by welding a tee of tubing between the outlet ports of the respective valve bodies. The tubing and valve outlet passages in the resulting assembly define a "dead leg" which is longer than optimal. Dead legs and poorly drained internal valve surfaces represent places where a product or chemicals may undesirably pool.

BRIEF SUMMARY OF THE INVENTION

The present invention resolves the problem of dead legs and poorly drained areas in valve assemblies. The present invention accomplishes this by providing an unique valve assembly which orients a particular surface of the valve to decrease or eliminate pooling such as dead leg areas.

An integrated diaphragm valve body defining at least two separate valves is disclosed. The valve assembly has a normal orientation which establishes whether a particular surface is horizontal or not, and whether it is upward-facing or not. Upward-facing surfaces which are horizontal or concave tend to allow a liquid to pool, while downward-facing surfaces and substantially convex or non-horizontal surfaces do not allow a liquid to pool. In the present invention, downward-facing surfaces, as well as upward-facing surfaces which are neither horizontal nor convex, and more generally any surfaces which do not allow liquid to pool, are defined as "non-pooling" surfaces.

The valve body includes surfaces defining a first port, a second port, and a third port. Other surfaces of the valve body define a first weir and a second weir.

The first weir separates the first port from the second port. The first weir has a first face and a second face. The first face is located on the same side of the first weir as the first port. The first face and the surfaces defining the first port define a first passage. The second face of the first weir is located on the same side of the first weir as the second port. The second face of the first weir and the surfaces defining the second port define a second passage in the valve body.

The second weir separates the second port from the third port. The second weir has a first face on the same side of the second weir as the third port. The first face of the second weir and the surfaces defining the third port define a third passage. The second weir has a second face further defining the second passage. The second face of the second weir is a non-pooling surface and self-drains through one of the ports when the valve body is in its normal orientation.

Many variations and specific features can be included or excluded, within the scope of the present disclosure.

The valve body can optionally be made in one piece, as by casting and machining a block of suitable metal such as stainless steel.

Optionally, all of the interior surfaces of the valve body can be non-pooling surfaces which will self-drain through at least one of the first, second, and third ports when the valve body is in the normal orientation and the necessary valves are open. For example, the second face of the first weir optionally can be a non-pooling surface which self-drains through the third port when the valve body is in the normal orientation.

The second face of the second weir optionally can be merged with the surfaces defining the second passage. Merging the second face with these surfaces means that the second face is a continuation of at least one of these surfaces without any discontinuity or abrupt change defining a boundary between them.

Having briefly described this invention, the above and further objects, features and advantages thereof will be recognized by those skilled in the pertinent art from the following detailed description of the invention when taken in conjunction with the accompanying drawings.

BRIEF DESCRIPTION OF THE SEVERAL VIEWS OF THE DRAWINGS

Identical reference characters for different views indicate like or corresponding parts.

DETAILED DESCRIPTION OF THE INVENTION

All terminology shall have its broadest interpretation unless specifically defined otherwise. The term "sanitary" is used broadly with reference to material which is sanitary, near-aseptic, or aseptic, unless a specific distinction is made. The term "food" is used as one nonexclusive example of material which is prepared or packaged under sanitary conditions. The present apparatus is also suitable for processing orally and non-orally administered pharmaceutical preparations or any other material which is perishable of may cause processing difficulties if the material is allowed to accumulate in the apparatus or support microbial growth. The entire specification and all of the drawings of U.S. patent application Ser. No. 08/810,613 are hereby incorporated by reference.

Figure 1:
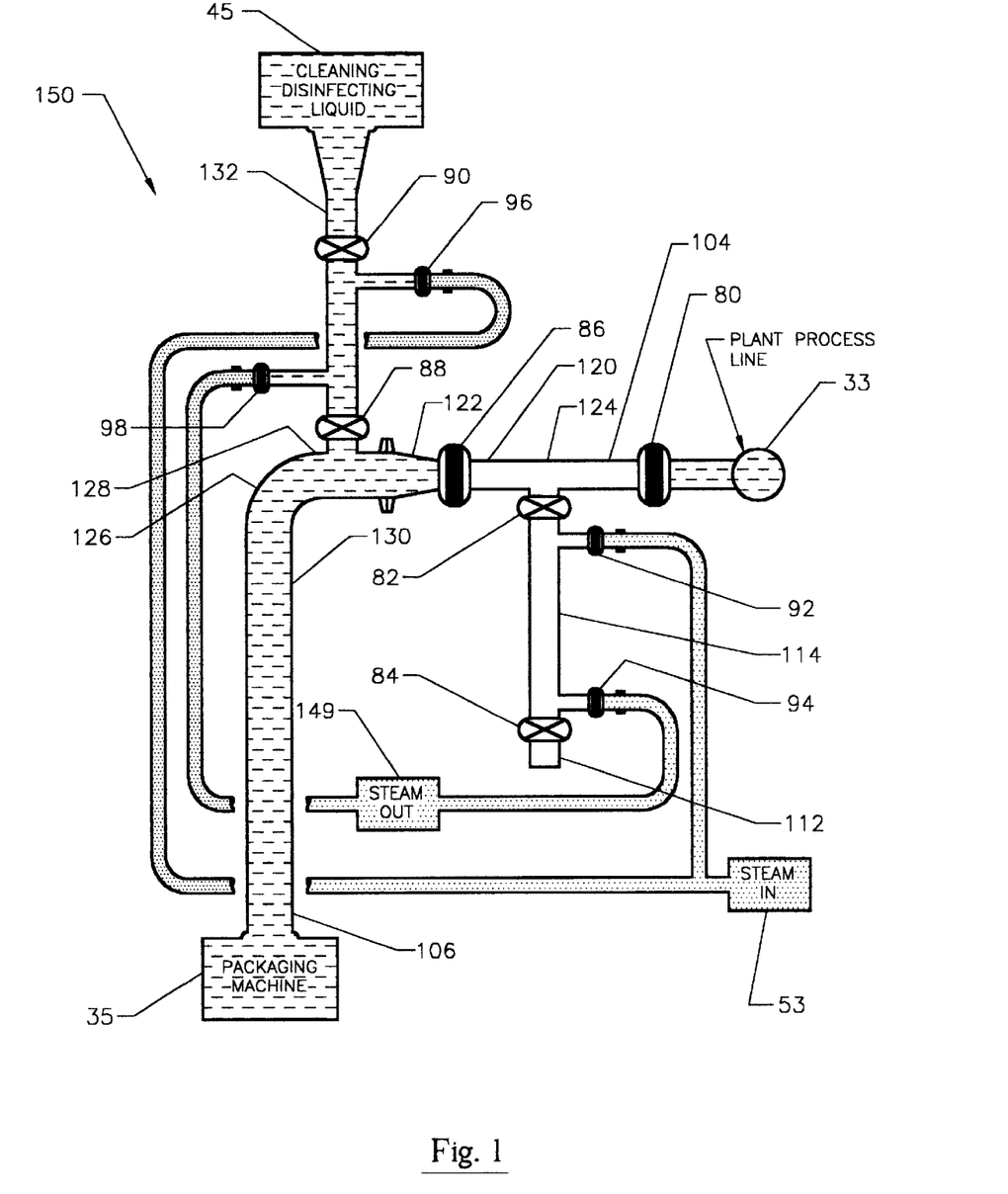
FIG. 1 is a schematic view of an interface between a food product plant process line, a packaging machine, and its cleaning fluid and steam supplies.

FIG. 1 shows a suitable environment for the present valve assembly: an interface 150 between a process line 33, a packaging machine 35, and cleaning fluid and steam supplies 45 and 53. The illustrated interface 150 has ten valves, identified by reference characters 80–98. The valves 80, 82, 84, 86, 88, and 90 are self-draining, diaphragm shut-off valves which are rated to pass or contain food liquids and cleaning liquids and to at least contain steam at sterilizing pressures and temperatures. The valves 92 and 96 are steam inlet valves, and the valves 94 and 98 are steam/condensate drain valves which restrict steam flow at the outlet and drain condensate.

As used herein, particularly for the valves 80–90, the terms "inlet" and "outlet" are each broadly and non-literally defined, as fluids flow in both directions through many of the valves in the interface 150 at various times. For convenience, the sides of the valves 80, 82, 84, and 86 at which the food product flowing from the process line 33 normally enters are sometimes defined as the inlets of those valves, while the sides of the valves 88 and 90 at which the cleaning liquid flowing from the source 45 normally enters are sometimes defined as the inlets of those valves. Also, "upstream" and "downstream" are defined at any time with respect to the flow of a particular fluid. Different fluids, or even a particular fluid at different times, flow in different directions. Further, one structure which is "adapted to communicate" or "for communicating" with another is defined in this specification and the claims as one which can communicate with the other, assuming any valves between them are opened.

The insertion of an additional valve, vessel, tank, etc., between two structures does not prevent them from being "adapted to communicate" or "for communicating" as defined here. Still further, the present specification identifies "at least one" of many structure, of which only one is shown in the particular embodiments described in the specification and drawings. Two, three, four, or more of each of these structures, arranged in series or parallel, are specifically contemplated as alternative embodiments.

Returning to FIG. 1, food or other material to be packaged is admitted to the interface 150 from the plant process line 33 via the valve 80. The valve 82 is at least one drain valve for communicating between the outlet of the product supply valve 80 and the drain 112, here via a drain line 114. The valve 84 is another drain line valve placed in series with the valve 82 for communicating between the drain line 114 and the drain 112. An isolation space is defined between the valves 82 and 84.

The valve 86 is at least one isolation valve having at least one inlet 120 for communicating with the outlet 104 of the product supply valve 80 and at least one outlet 122 for communicating with the product dispensing machine outlet 106. The tee 124 defines an open common space between the valves 80, 82, and 86. The arms of the tee 124 can be slanted toward their junction sufficiently to drain its entire contents through the valve 82 when the valves 82 and 84 are open, so the tee 124 can drain completely when it is not in use. For compactness the tee 124 can be collapsed so there is very little separation between the valves 80, 82, and 86.

The elbow 126 has a first run 128 which is slanted away from the outlet 122 and a second run 130 which communicates with the first run 128 and the product dispensing machine outlet 106. This again is self-draining construction.

The second run 130 has a cleaning liquid inlet or branch 132 for supplying cleaning liquid from the source 45 to the interface 150 and, in this embodiment, the packaging machine 35. Separate supplies of cleaning liquid could also be supplied for the interface 150 and the machine 35, by providing a different arrangement The branch 132 has an outlet defined by the outlet of at least one first cleaning liquid supply valve 88 for communicating with the product dispensing machine outlet 106.

The branch 132 also has at least one second cleaning liquid supply valve 90 for communicating between the cleaning liquid source 45 and the first cleaning liquid supply valve 88.

The valves 92 and 96 are steam inlet valves connected by suitable piping to the steam source 53. The valves 92 and 96 communicate with the drain line 114 and the branch line 132, respectively. The valves 94 and 98 are steam drain valves communicating with the drain line 114 and the branch line 132, respectively. The valves 94 and 98 communicate with the condensate drain 149.

Figure 2:
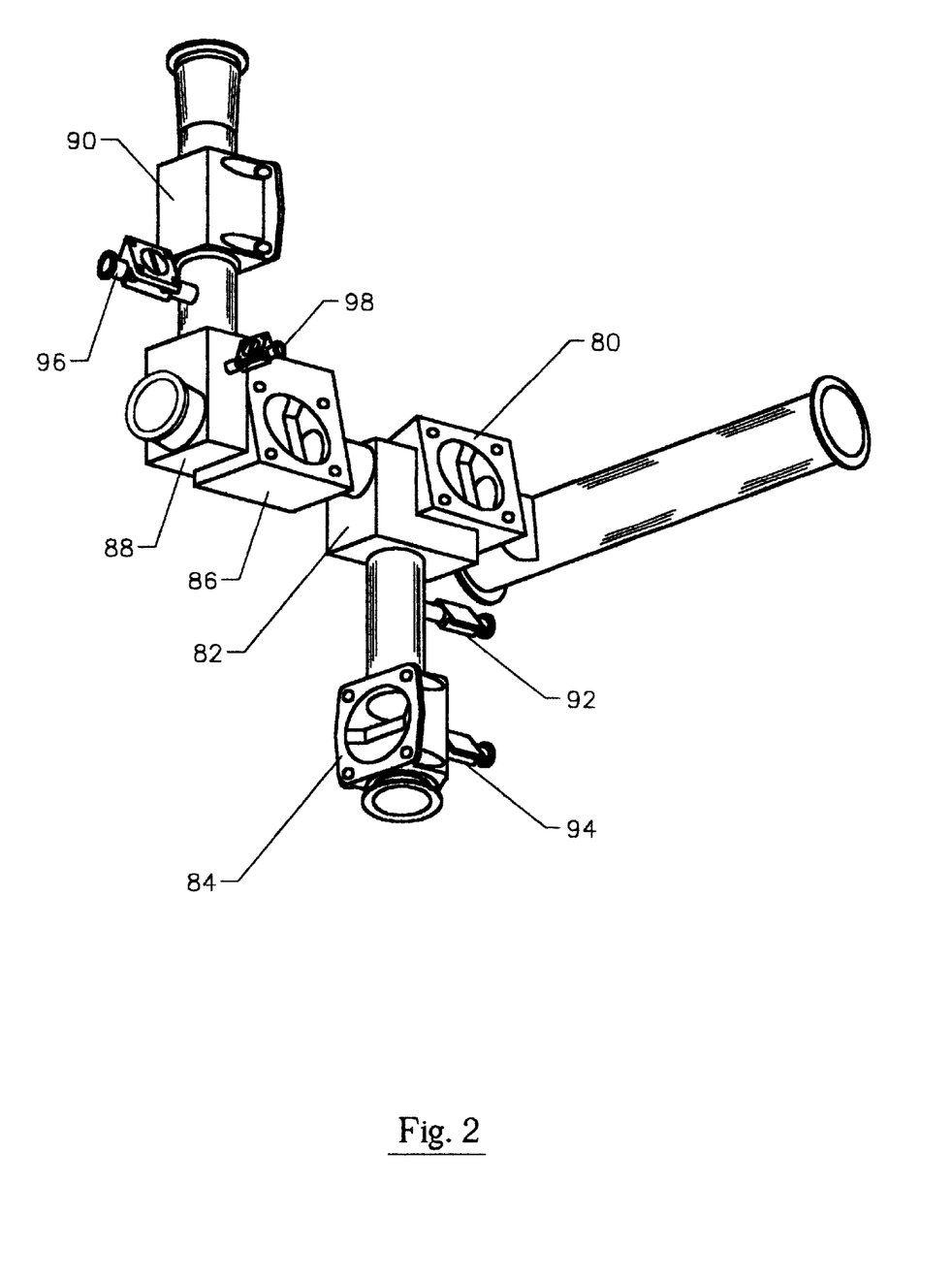
FIG. 2 is a perspective view of the interface of FIG. 1, with the valve diaphragms, elements, and operators removed to show the orientation of the valve bodies.
Figure 3:
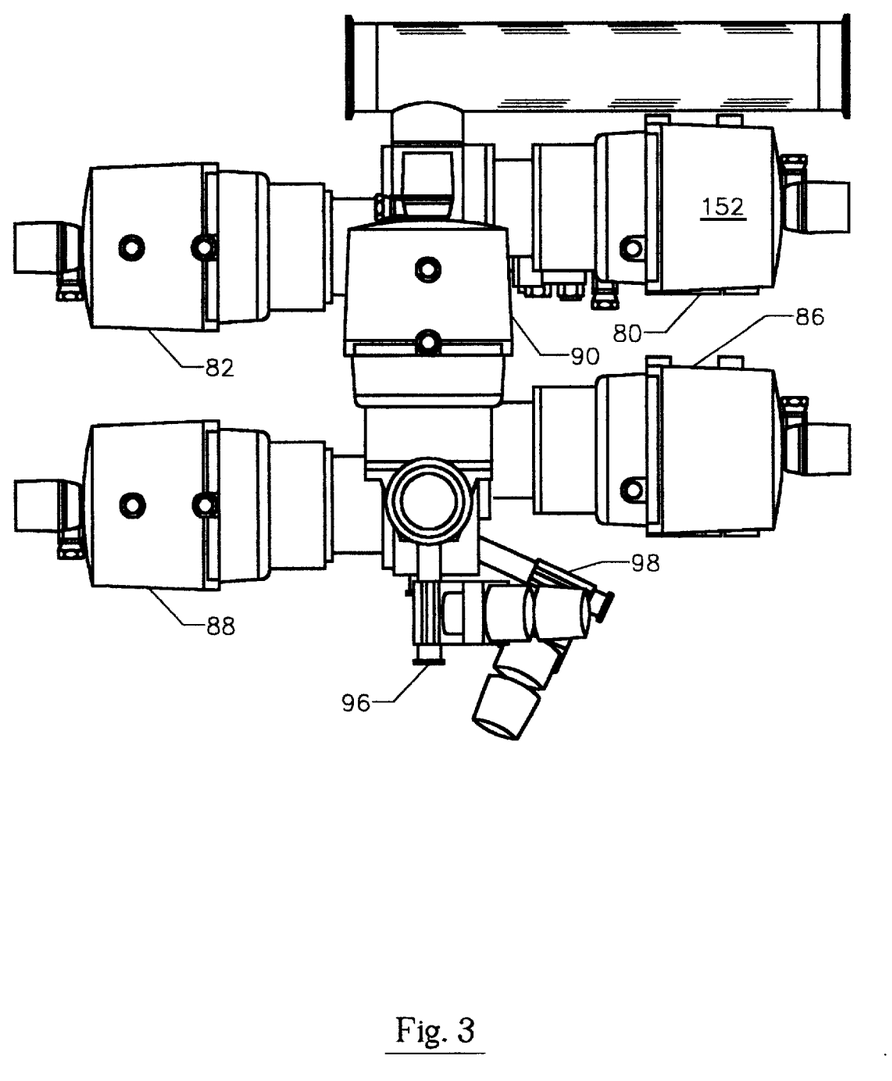
FIG. 3 is a top plan view of the embodiment of FIG. 2, showing the valves fully assembled.

The entire branch 132 is vertical, and joins with the generally horizontal first run Refer now to FIGS. 2 and 3, which show more practical details of the construction of the embodiment of FIG. 1. FIG. 2 illustrates partial consolidation of several of the valve bodies. This not only saves space and weight, but improves drainage from within the valves and reduces the lengths of passages between the valves which are sometimes known as "dead legs" because they represent areas where material flow can stagnate. Specifically, the valves 80 and 82; 84 and 94; and 86, 88, and 98 are integrated in this embodiment. The respective valves are also oriented so each one will drain properly thereby minimizing the dead leg effect, which is accomplished by the bodies of the valves 80 and 82, or the valves 86 and 88, tilted relative to each other.

FIG. 3 is a bottom plan view of the embodiment of FIG. 2, showing the valves fully assembled with their valve operators—such as the operator 152 of the valve 80—in place. The valve operators can be conventional.

Figure 6:
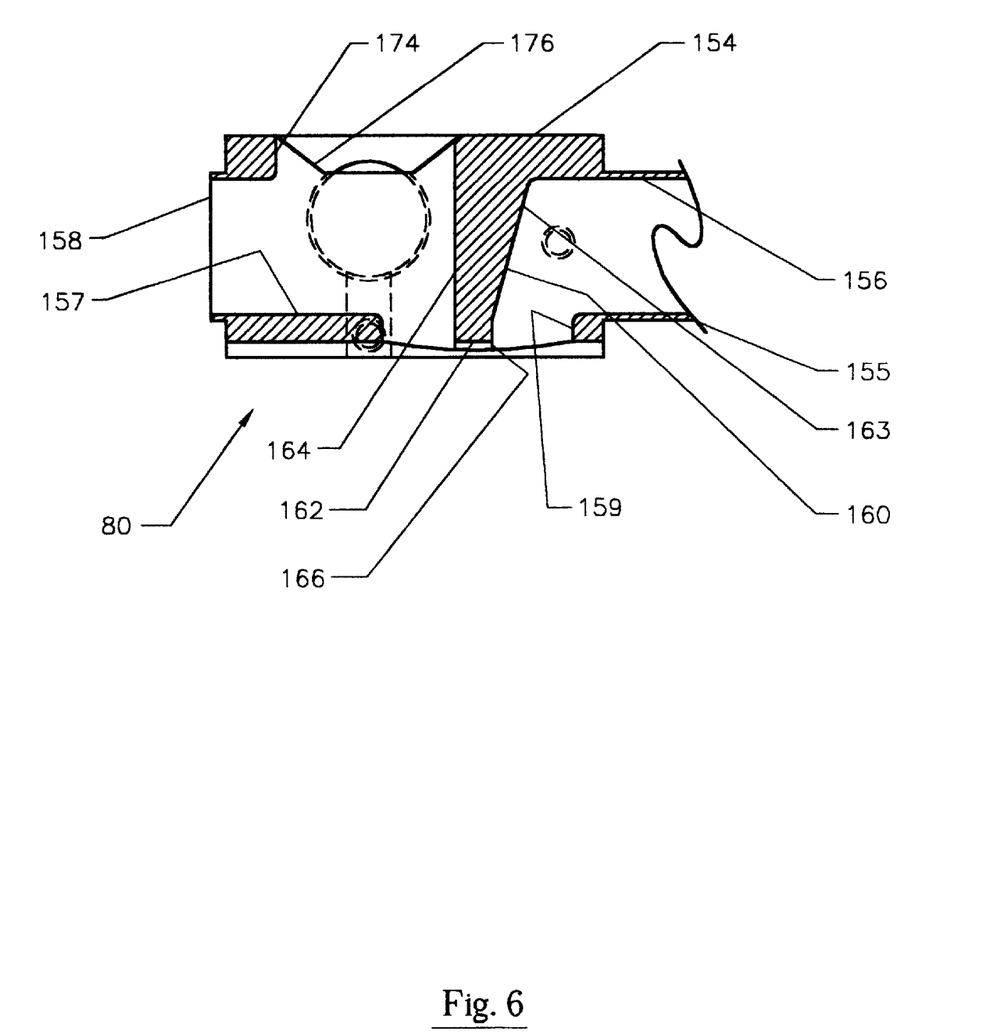
FIG. 6 is a section taken along section 6—6 of FIG. 4.

Various types of valves can be used within the scope of the present invention. The illustrated valves are diaphragm valves suitable for dairy produce piping. The parts of each valve 80–96 are best illustrated by FIG. 6, which is a section through the valve 80. The valve body 154 is a machined, cast, or otherwise formed block of stainless steel or other suitable material. The valve body 154 defines a first port 155 defined by the wall of an inlet passage or first passage 156, an outlet passage 157 terminating in a second port or outlet 158, and a diaphragm aperture 159. In this embodiment, the inlet 156 and outlet 158 are at least generally in line, but they could be arranged out of line instead. The inlet 156 and outlet 158 are separated by a weir 160 having a seat 162 which faces the diaphragm aperture 159. The weir 160 further includes a first face 163 on the same side of the first weir 160 as the first port 155 and a second face 164 on the same side of the first weir 160 as the second port 158. A diaphragm made of an elastomeric polymer covers and seals the aperture 159 and supports an integral valve element. The diaphragm is flexed perpendicular to its plane by the valve operator to bring the valve element into or out of engagement with the seat 162, thus selectively closing of opening the valve 80.

FIGS. 4–7 show further integration of the product valves 80 and 82 and the steam inlet valve 92. FIG. 1 illustrates that the valve 80 allows product to enter from the process line 33 en route to the packaging machine 35, while the valve 82 controls access to a drain line 114 which may pass waste fluids and additionally recirculate cleaning fluids. The steam inlet valve 92 provides steam in the drain line 114 and downstream of the valve 80.

Figure 4:
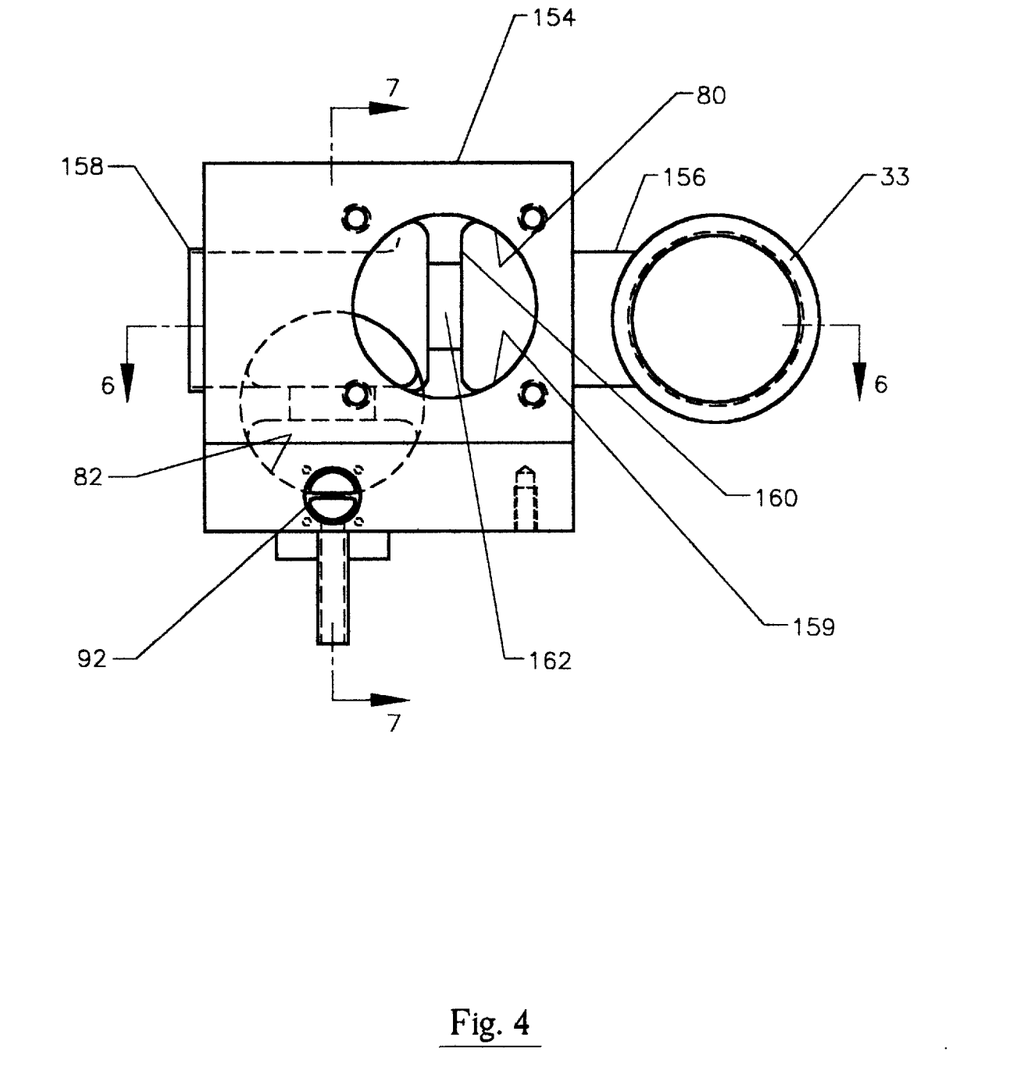
FIG. 4 is an isolated front elevation of an assembly of the valves 80, 82, 92 similar to FIG. 2, but modified to further integrate the valves. Interior structure is shown by phantom lines.
Figure 5:
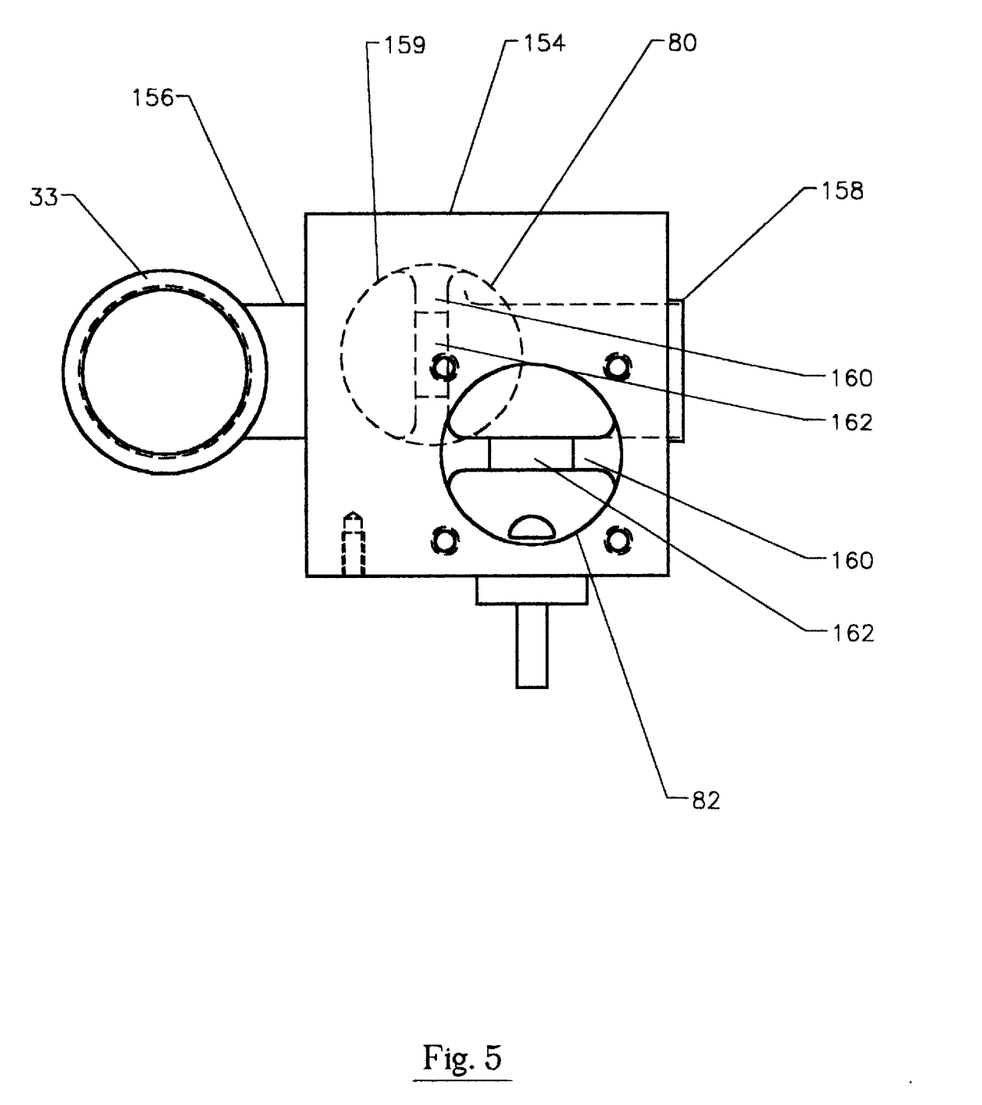
FIG. 5 is a rear elevation of the assembly of FIG. 2. Interior structure is shown by phantom lines.
Figure 7:
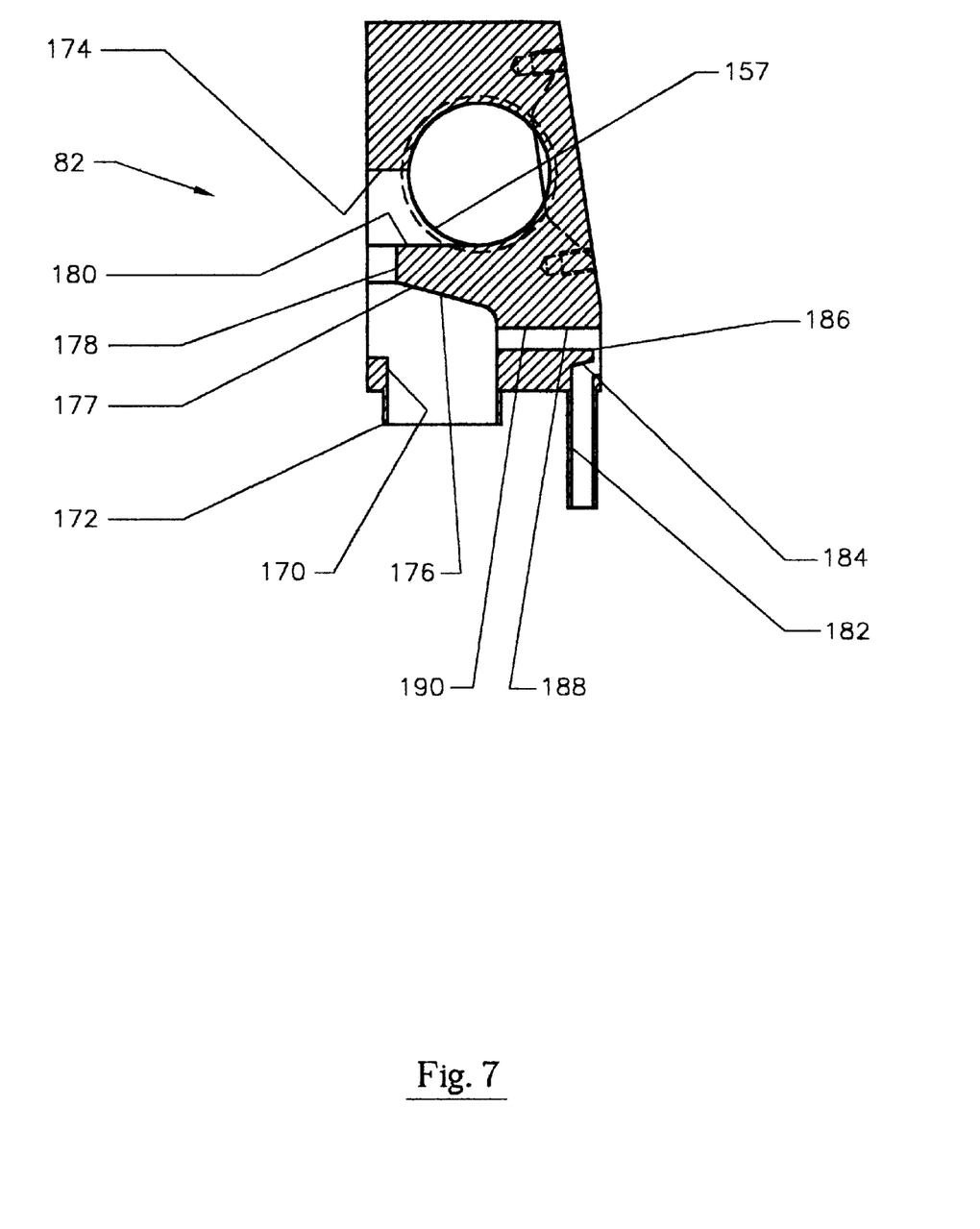
FIG. 7 is a section taken along section 7—7 of FIG. 4.
Figure 8:
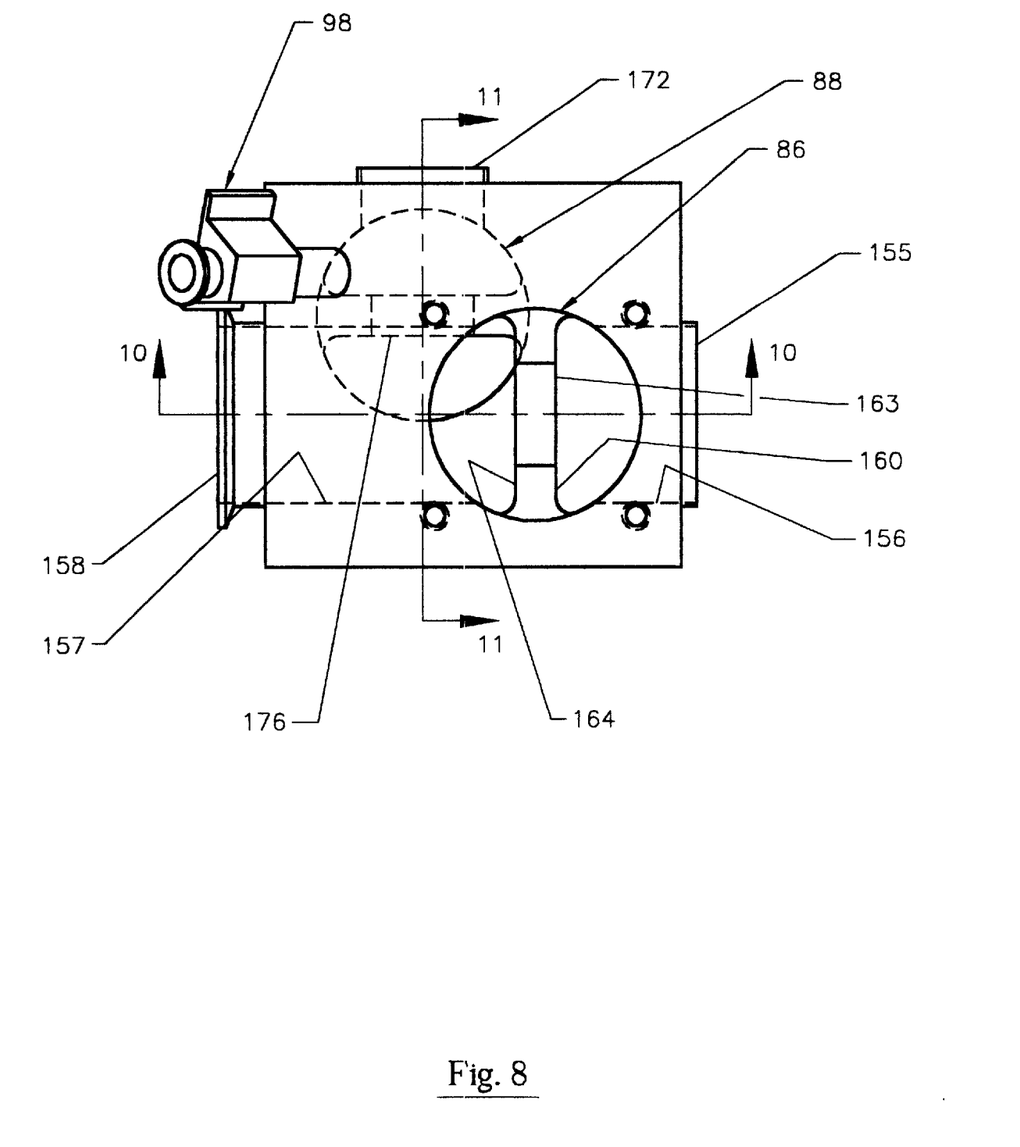
FIG. 8 is a view similar to FIG. 4 of a second embodiment of the invention, showing an assembly of the valves 86, 88, and 98.
Figure 9:
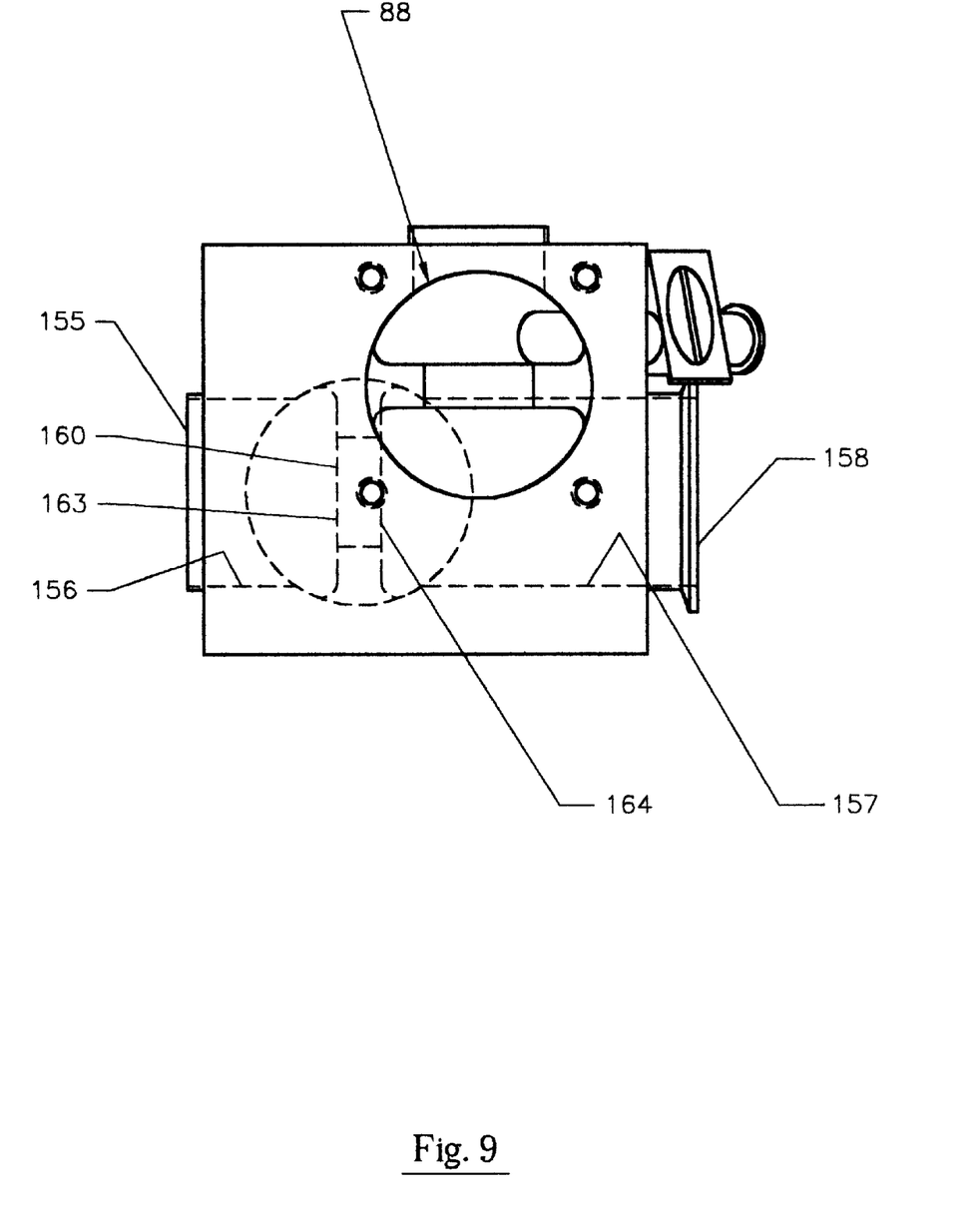
FIG. 9 is a view similar to FIG. 5 of the embodiment of FIG. 8.
Figure 10:
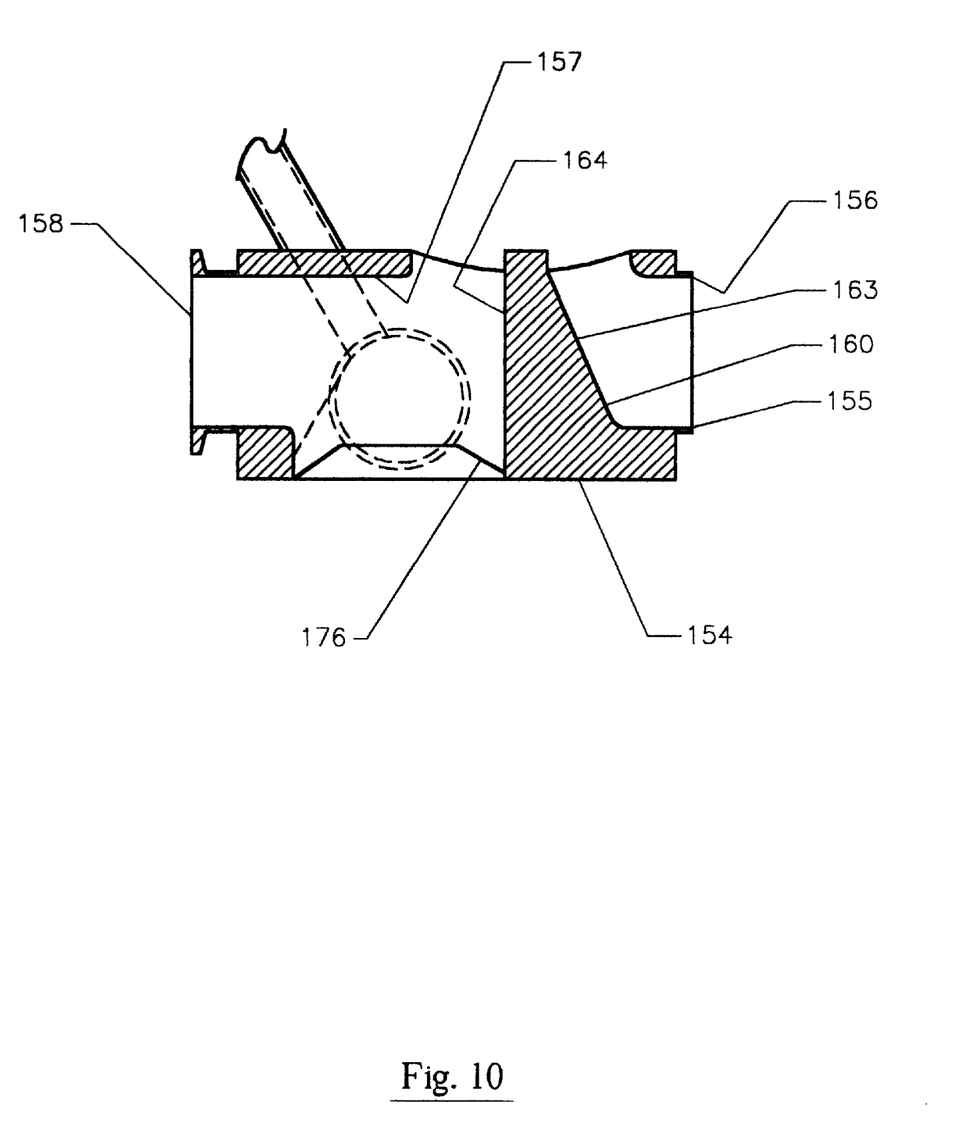
FIG. 10 is a section taken along line 10—10 of FIG. 8.
Figure 11:
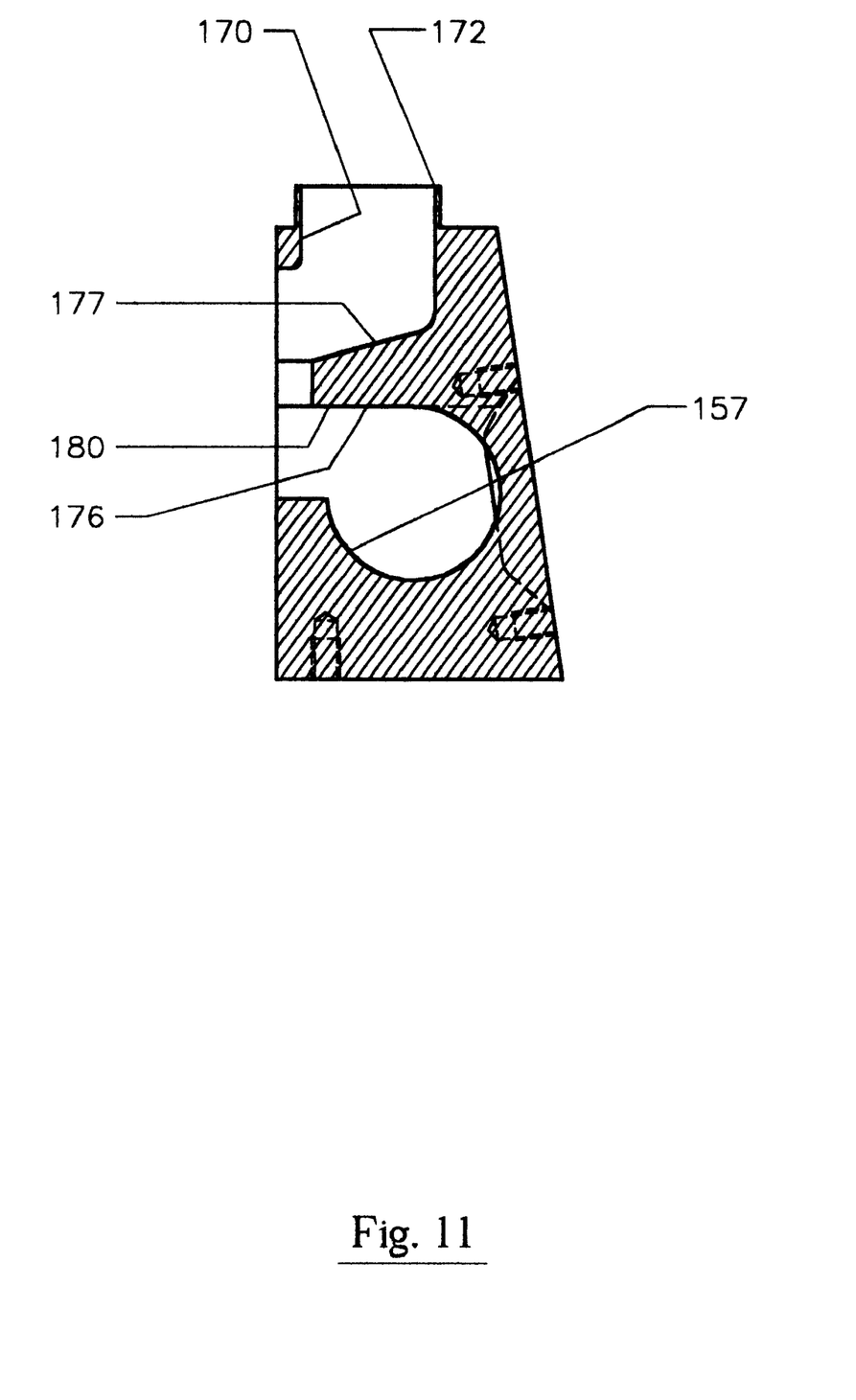
FIG. 11 is a section taken along line 11—11 of FIG. 8.

Referring to FIGS. 4 and 7, the valve 82 shares the valve body 154 with the valves 80 and 92. The valve 82 has an inlet passage 157 which is also the outlet passage of the valve 80. The valve 82 has an outlet passage 170 terminating in a third outlet 172, a diaphragm aperture 174, ad a weir 176 having a seat 178. The diaphragm and valve element of the valve 82 are not illustrated in FIGS. 4 and 7.

As is best illustrated in FIG. 7, the weir 176 has a first face 177 on the same side of the second weir as the third port 172. The weir 176 has a second face 180 on the same side of the second weir 176 as the third port 172. This second face also defines a portion of the outlet passage 157. The inlet face is shaped and positioned so it is self-draining over the seat 178 of the weir 176 when the valve 82 is opened. The valves 80 and 82 are oriented orthogonally to facilitate their integration into a self-draining unit with no dead legs. The outlet 172 empties into the drain line 114, as described previously in connection with FIG. 1.

FIG. 7 also best shows the steam inlet valve 92, which also is a diaphragm valve formed in the valve body 154. The valve 92 admits steam into the third passage. The valve 92 has an inlet passage 182, a weir 184, a seat 186, a diaphragm aperture 188, and an outlet passage 190 analogous to the corresponding elements of the valves 80 and 82. The inlet passage 182 is connected to the steam source 53 (see FIG. 2). The outlet passage 190 empties into the outlet passage 170 of the valve 82. The outlet passage 190 is formed and positioned to be self-draining into the outlet passage 170. The diaphragm and valve element of the valve 92 are like those of the valve 80, except that if the sterilizing fluid is steam or other fluid at an elevated temperature or pressure, the diaphragm and valve element for the steam inlet valve 92 must be thermally and chemically resistant. The necessary diaphragm materials are known and readily available to those skilled in the art.

FIG. 8–11 show a similar integration of the valves 86, 88, and 98 in a single valve body, here formed of one block of stainless steel. The placement of the steam valve is different. Corresponding parts of FIGS. 8–11 bear the same reference characters as in FIGS. 4–7.

FIGS. 8–11 show an integrated diaphragm valve body 154 having a first port 155, a second port 158, and a third port 172. A first weir 160 separates the first port 155 from the second port 158. The first weir 160 has a first face 163 on the same side of the first weir 160 as the first port 155. The first face 163 and the surfaces defining the first port 155 defined a first passage 156. The first weir 160 has a second face 164 on the same side of the first weir 160 as the second port 158. The second face 164 and the surfaces defining the second port 158 define a second passage 157. A second weir 176 separates the third port 172 from the second port 158. The second weir 176 has a first face 177 on the same side of the second weir 176 as the third port 172. The first face 177 of the second weir 176 and the surfaces defining the third port 172 define a third passage 170. The second weir 176 has a second face 180 further defining the second passage 157.

The second face 180 of the second weir 176 is a non-pooling surface which self-drains through the third port 172 when the valve body 154 is in the normal orientation.

Still referring to FIGS. 8–11, all the internal surfaces of the valve body 154 are non-pooling surfaces which are self-draining through at least one of the first port 155, second port 158, and third port 172 when the valve body 154 is in the normal orientation and the valve controlling the drainage is open. For example, the second face 164 of the first weir 160 is a non-pooling surface which self-drains through the third port 172 when the valve body is in the normal orientation.

The second face 180 of the second weir 176 is merged with the surfaces defining the second passage 157 to define an essentially continuous surface.

Thus, valve assemblies have been described which have several desirable features. In particular, dead legs and discontinuities in the valves which can collect undesired deposits are minimized, the size and weight of the valve assemblies are reduced, and the respective orientations of the integrated valves are fixed so the valves will operate and drain properly. From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes, modifications and substitutions of equivalents may be made therein without departing from the spirit and scope of this invention which is intended to be unlimited by the foregoing except as may appear in the following appended claims. Therefore, the embodiments of the invention in which an exclusive property or privilege is claimed are defined in the following appended claims.

I claim:

1. A valve assembly integrated on a form, fill and seal packaging machine, the packaging machine having a product source, a disinfecting liquid source and a drain, the drain, the disinfecting liquid and product source in flow communication with the valve assembly, the valve assembly comprising:

a first valve having internal surfaces defining a flow path therethrough the first valve being in flow communication with the product source; and a second valve having internal surfaces defining a flow path therethrough the second valve being in flow communication with the drain and in flow communication with the first valve;

wherein the flow path through the first valve is oriented orthogonally to the flow path through the second valve to provide for self-draining and a reduction in pooling surfaces.

2. The valve assembly according to claim 1 further comprising a third valve having internal surfaces defining a flow path therethrough the third valve being in flow communication with the disinfecting liquid and a fourth valve having internal surfaces defining a flow path therethrouph the fourth valve being in flow communication with the first valve and the second valve, wherein the flow path through the third valve is oriented orthogonally to the flow path through the fourth valve to provide for self-draining and a reduction in pooling surfaces.

3. The valve assembly according to claim 2 wherein the fourth valve is in flow communication with a filling station on the packaging machine.

4. The valve assembly according to claim 2 further comprising a fifth valve juxtaposed between the second valve and the drain.

5. A valve assembly integrated on a form, fill and seal packaging machine, the packaging machine having a product source and a drain, the drain and the product source in flow communication with the valve assembly, the valve assembly comprising:

a first valve defining a first flow path, the first valve being in flow communication with the product source and a filling station on the packaging machine; and a second valve defining a second flow path, the second valve being in flow communication with the drain and in flow communication with the first valve;

wherein the first flow path is oriented orthogonally to the second flow path to provide for self-draining and a reduction in pooling surfaces.

* * * * *